United States Patent [19]
Hackett et al.

[11] Patent Number: 5,793,430
[45] Date of Patent: Aug. 11, 1998

[54] METHOD AND APPARATUS FOR CORRECTING MOTION VECTORS

[75] Inventors: Andrew Hackett, Klingenthal, France; Michael Knee, Petersfield, United Kingdom; Michel Kerdranvat, Bischoffsheim; Nadine Bolender, Strasbourg, both of France

[73] Assignee: Thomson Consumer Electronics, S.A., Courbevoie, France

[21] Appl. No.: 976,937

[22] Filed: Nov. 24, 1997

Related U.S. Application Data

[63] Continuation of Ser. No. 316,046, Sep. 30, 1994, abandoned.

[30] Foreign Application Priority Data

Oct. 11, 1993 [EP] European Pat. Off. ............ 93402507

[51] Int. Cl.⁶ .................................................. H04N 7/32
[52] U.S. Cl. ................................................ 348/416; 348/699
[58] Field of Search ............................. 348/384, 390, 348/402, 407, 409–413, 415, 416, 420, 699; 382/232, 236, 238; H04N 7/130, 7/137

[56] References Cited

U.S. PATENT DOCUMENTS

| | | | |
|---|---|---|---|
| 4,862,264 | 8/1989 | Wells et al. | 348/416 |
| 4,864,398 | 9/1989 | Avis et al. | 348/699 |
| 5,016,102 | 5/1991 | Avis | 348/416 |
| 5,027,203 | 6/1991 | Samad et al. | 348/699 |

*Primary Examiner*—Richard Lee
*Attorney, Agent, or Firm*—Joseph S. Tripoli; Frederick A. Wein

[57] ABSTRACT

Motion vectors resulting from block matching are corrected for periodic structures by taking a more reliable vector from an edge of a moving object containing the periodic structure. This is done by calculating and comparing different error combinations to identify periodic structures and replacing a current motion vector with one of an adjacent pixel block either from the block to the left or from the block above, which ever yields the smaller error in the current block, or by taking a combination (e.g., mean) of both vectors. Advantageously, artifacts such as phase reversal of information in interpolated fields due to the presence of an erroneous vector in a periodic structure are reduced and very little additional processing is required after the block matching itself.

8 Claims, 2 Drawing Sheets

METHOD AND APPARATUS FOR CORRECTING MOTION VECTORS

This is a continuation of application Ser. No. 08/316,046, filed Sep. 30, 1994 now abandoned.

FIELD OF THE INVENTION

The present invention relates to a method and to an apparatus for correcting motion vectors.

BACKGROUND OF THE INVENTION

Block matching is well known as a robust and intuitively simple method of motion estimation for television pictures. The block matching method of motion estimation works well when there is large or varied detail in each block.

SUMMARY OF THE INVENTION

It is herein recognized that block matching can give incorrect results if the information in a block consists of a periodic structure, for example railings or Venetian blinds.

The problem is fundamental to the fact that typical television field rates of 50 Hz or 60 Hz constitute severe temporal under sampling, leading to aliasing and therefore ambiguity in determining exactly what is present in the original moving image sequence. If the goal of the motion estimation is to provide a prediction, for example in coding applications, the problem of periodic structures is usually unimportant because a good prediction can be obtained even using the 'wrong' motion vector.

However, when the application is temporal interpolation, for example 50 Hz to 100 Hz upconversion, the effect on the interpolated picture of an erroneous vector in a periodic structure can be severe, often leading to a complete phase reversal of the information in the interpolated field.

It is one object of the invention to disclose a method for correcting motion vectors in case of periodic structures in the picture.

It is a further object of the invention to disclose an apparatus which utilizes the invention method.

According to the invention, the motion vectors resulting from block matching are corrected for periodic structures by taking a more reliable vector from the edge of a moving object containing the periodic structure. The invention requires very little additional processing after the block matching itself.

The invention consists of two parts: detection of periodic structures and correction of motion vectors if a periodic structure is detected.

DETECTION OF PERIODIC STRUCTURES

Conventional block matching works usually by calculating a mean square or mean absolute error value for each candidate motion vector and selecting the motion vector that yields the minimum error. The block matching may be conventional or 'two-sided' as described in EP-A-93402187 of the applicant. In order to save hardware complexity, the invention makes use of the error values already calculated in the block matching process.

Detection of periodic structures makes use of the fact that, if a block consists of a periodic structure, there will be other error values very close to the minimum value but corresponding to other motion vectors. But it is not sufficient simply to find another error value close to the minimum to be sure that the block is a periodic structure. First, errors for motion vectors very close to the chosen basic motion vector must be ignored, because the block might simply be low in detail or the true motion vector may be halfway between two adjacent candidates. Second, it should be recognized that non-periodic blocks containing detail in only one direction (for example edges) will give rise to a line of minima in the perpendicular direction, which should not be taken to indicate periodicity.

In general, this line of minima LOM will intersect a given horizontal row HOR (or vertical column) of errors at only one point POI, as shown in FIG. 2. The one exception to this, which is when the line of minima is itself horizontal (or vertical), is discussed below. In all other cases, the search for errors close to the minimum can be restricted to one horizontal row (or column), for example, the row (or column) containing the minimum. Periodic structures will in general give rise to a set of parallel lines of minima, which will intersect the horizontal row (or vertical column) in several places enabling the periodic structure to be detected. (However, due to picture statistics and hardware requirements the search along a row is preferred).

Therefore, the search is restricted to the row of errors containing the minimum and the errors adjacent to the minimum are ignored. This approach will overcome the false detection of periodic structures except in the case of blocks containing only vertical detail, which will produce a horizontal row of minima. This case can be detected by looking also at the maximum error in the row, demanding that it should exceed a certain value before the block can be deemed to be periodic. A look is taken at the row containing the motion vector because the vector range is usually much wider horizontally than vertically.

A further requirement is that the detection of periodic structures is more or less independent of the overall dynamic range of the block. Thus, the thresholds used for comparison should be scaled by some measure of this dynamic range. An approximate measure of dynamic range in the block and the area surrounding it or in a block shifted according to the current minimum error position is the maximum error resulting from the block matching process.

CORRECTION OF MOTION VECTORS IN PERIODIC BLOCKS

If a block is periodic, the current motion vector is replaced by a more reliable one. The first approach is to replace the motion vector by the one calculated for the block immediately to the left, observing that the block may already have had its motion vector modified by the periodic structure algorithm. This approach assumes that the correct motion can be found to the left of the current block. A preferred approach is to select either the motion vector from the block to the left or the one from the block immediately above, whichever yields the smaller error in the current block, or to take a combination, in particular the mean, of both vectors. It would be possible in principle to look below and to the right (e.g. mean of all surrounding motion vectors), but in most hardware implementations this would lead to a massive increase in complexity. A possible refinement is to accept a replacement vector only if its error in the current block is below a certain threshold.

In principle, the invention method is suited for correcting motion vectors which are related to pixel blocks into which the pictures of a video signal are divided and includes the following steps:

evaluating error values which are related to a matching of said pixel blocks between different pictures of said video signal, whereby, additional to a basic minimum error, a further minimum error belonging to adjacent pixel positions, except directly adjacent pixel positions, is searched along the row, or column, containing the pixel position of said basic minimum error;

comparing said further minimum error with a preselected threshold, resulting in a periodic structure decision if such further minimum error is less then said threshold;

when a periodic structure in the picture content is detected, replacing the current motion vector corresponding to said basic minimum error by a motion vector of an adjacent pixel block, in particular either from the block to the left or from the block above, whichever yields the smaller error in the current block, or by taking the mean of these both vectors.

In principle the inventive apparatus for correcting motion vectors which are related to pixel blocks, into which the pictures of a video signal are divided, includes:

a) evaluating means for error values which are related to a matching of said pixel blocks between different pictures of said video signal, whereby:

basic minimum error related to the current motion vector;

second minimum value means calculate a further minimum error belonging to adjacent pixel positions, except directly adjacent pixel positions, along the row, or column, containing the pixel position of said basic minimum error;

first maximum value means calculate a maximum error from said error values, from which two threshold values are derived, using errors involved in the calculation of said basic minimum error, which in particular belong to the current block or to a block, shifted according to the current minimum error position;

second maximum value means calculate from said error values a maximum error in the row, or column, containing the pixel position of said basic minimum error;

b) first comparing means for comparing the difference values between the outputs of said second and said first minimum value means with a first of said thresholds, resulting in first periodic structure decision if said further minimum error value is less then said threshold;

c) second comparing means for comparing the difference values between the outputs of said second maximum and said first minimum value means with a second of said thresholds, resulting in a second periodic structure decision of said further minimum error value is greater than/equal to said threshold;

d) combining means for forming a final periodic structure decision from said first and said second periodic structure decision;

e) vector replacement means which replace the current motion vector corresponding to said basic minimum error by a motion vector of an adjacent pixel block, in particular the left or the above or the mean of both, when said final periodic structure decision indicates that a periodic structure in the picture content is detected.

BRIEF DESCRIPTION OF THE DRAWING

The foregoing and further features of the invention are illustrated in the accompanying drawing wherein.

DETAILED DESCRIPTION

The following is a specific embodiment of the periodic structure detection part of the invention. Suppose that the motion vector range is $|-M,+M|$ horizontally and $|-N,+N|$ vertically, with the chosen motion vector equal to (X,Y). Let the errors for each motion vector resulting from the block matching process be $$E(x,y), x=-M, \ldots, +M, y=-N, \ldots, +N.$$

For E(x,y), x four quantities are calculated, namely:

$E_1=E(X,Y)$, (the minimum error)

$E_2=\max_{x,y}\{E(x,y)\}$, (the maximum error)

$E_3=\min_x(x \neq X-1, X, X+1)\{E(x,Y)\}$, (the row minimum away from (X,Y))

$E_4=\max_x\{E(x,Y)\}$, (the row maximum)

From the foregoing, the block is periodic if, and only if, $$E_3-E_1<E_2/4$$

and $$E_4-E_1 \geq E_2/2$$

Figure 1:
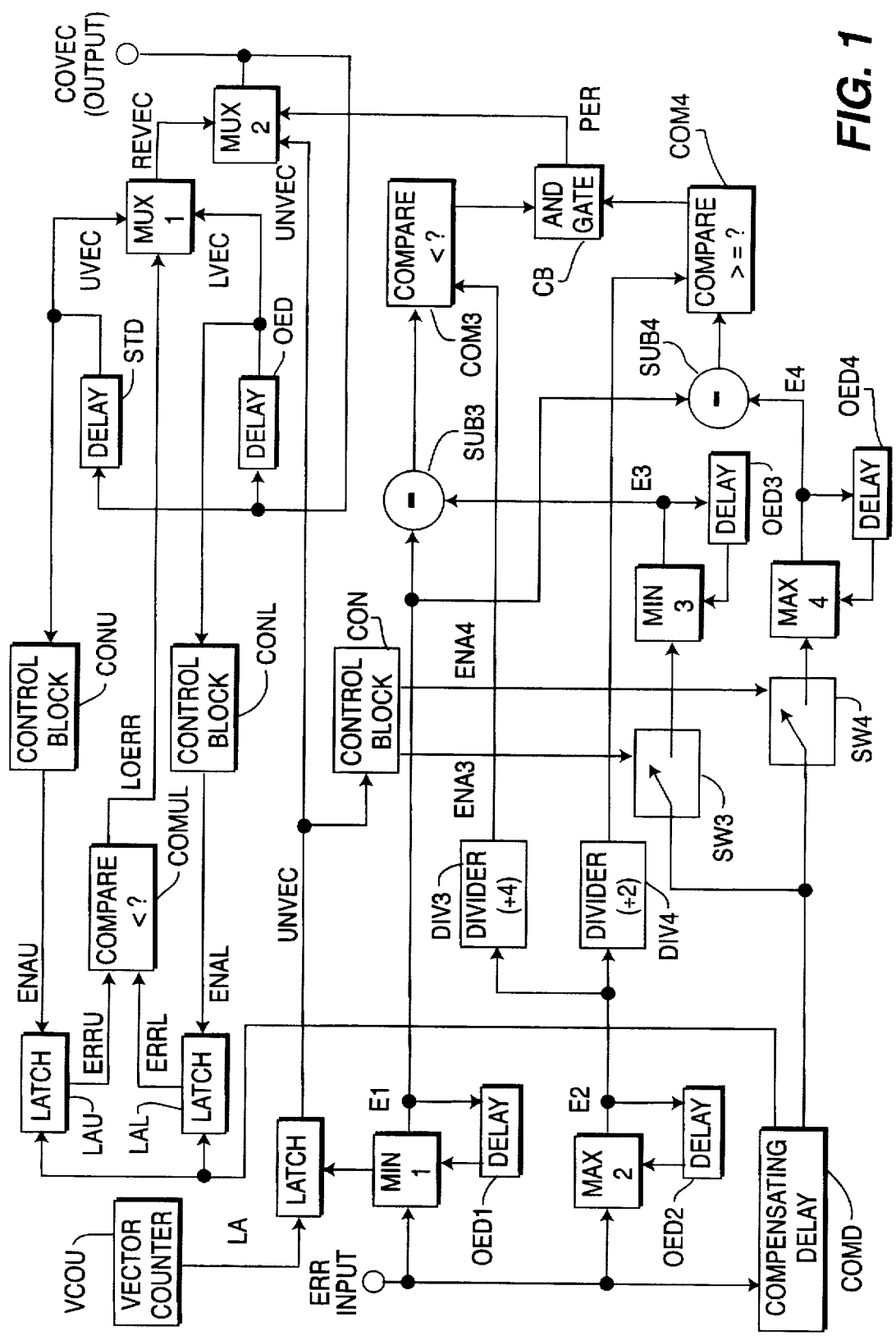
FIG. 1 is a block diagram of a motion vector correction circuit embodying the invention.
Figure 2:
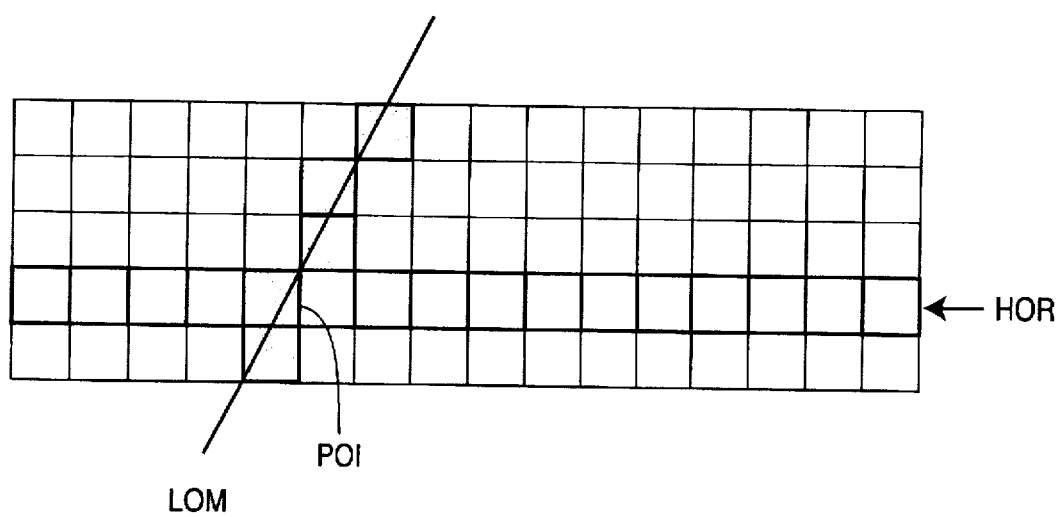
FIG. 2 is a diagram illustrating a line of error minima intersecting a row of pixels in operation of the circuit of FIG. 1.

FIG. 1 gives a block diagram of an exemplary hardware implementation of an inventive apparatus for periodic structure detection and correction, in accordance with the invention.

In FIG. 1 the block matching errors ERR provided by a conventional block matching unit (not illustrated) enter the apparatus serially in a predetermined order, synchronous with a vector counter VCOU which generates the corresponding motion vector coordinates x and y. The minimum $E_1$ of all the errors is calculated serially using a two-input minimum function circuit MIN1 and a one-sample feedback delay OED1. When all the errors have passed through, the vector UNVEC corresponding to the minimum will appear at the output of a latch LA. This vector UNVEC forms the input to a control block CON which generates two enable signals ENA4, ENA3, the first corresponding to the row containing the minimum error E1 for the calculation of the maximum row error $E_4$ and the second for the same row, excluding the minimum error and its adjacent errors, for the calculation of the specific minimum row error $E_3$.

The errors ERR pass also through a compensating delay COMD and two parallel switches SW3, SW4 which are controlled by signals ENA3, ENA4. E3 is calculated using a two-input minimum function circuit MIN3 following SW3 and a one-sample feedback delay OED3. E4 is calculated using a two-input maximum function circuit MAX4 following SW4 and a one-sample feedback delay OED4.

$E_3$ and $E_4$ are each subtracted in subsequent subtractors SUB3, SUB4 from $E_1$ and the results compared in comparing circuits COM3, COM4 with suitable fractions of $E_2$, the block maximum which is calculated in a similar way to the minimum $E_1$, using a two-input maximum function circuit MAX2 fed with errors ERR and a one-sample feedback delay OED2. E2 is divided by 4 (e.g. shift operation) in dividing circuit DIV3 and fed to COM3. E2 is also divided by 2 (e.g. shift operation) in dividing circuit DIV4 and fed to COM4. COM3 determines, if the output of DIV3 ($E_2/4$) is greater than the output of SUB3 ($E_3-E_1$). COM4 determines, if the output of DIV4 ($E_2/2$) is less than, or equal to, the output of SUB4 ($E_4-E_1$). The outputs of COM3 and COM4 are combined in an AND gate CB. A positive result PER from both comparisons indicates that the current block is periodic.

The errors related to the 'up' and 'left' vectors UVEC, LVEC emerging from suitable delay means STD and OED form the input to control blocks CONU, CONL which enable via signals ENAU, ENAL latches LAU, LAL to capture the two errors ERRU, ERRL corresponding to these two vectors. The result LOERR of a comparison in comparator circuit COMUL between these two errors ERRU and ERRL selects in a multiplexer MUX1 between the related two vectors UVEC, LVEC. The periodic structure detection signal PER selects in a further multiplexer MUX2 between the resulting replacement vector REVEC and the uncorrected vector UNVEC, the final result COVEC forming the output of the apparatus and the input to the delays OED and STD for subsequent replacement vectors.

OED is a one-element delay providing vector LVEC from the result vectors COVEC. STD is a stripe (line) delay providing vector UVEC from the result vectors COVEC.

The invention can be used in e.g. TV receivers, VCRs and CD-I players/recorders, also for standards conversion, slow motion generation and noise reduction.

What is claimed is:

1. A method for correcting motion vectors which are related to pixel blocks into which the pictures of a video signal are divided, comprising the steps of:

evaluating error values which are related to a matching of said pixel blocks between different pictures of said video signal, wherein for a current pixel block, in addition to determining a basic minimum matching error corresponding to a first matching position associated with a pixel position, a next minimum matching error corresponding to a second matching position which is not adjacent to said first matching position is determined, and wherein the second matching position is associated with a pixel position in that pixel row or pixel column, respectively, to which the pixel position corresponding to said first matching position is associated, comparing said next minimum matching error with a first preselected threshold, resulting in a periodic structure decision if said next minimum matching error is less than said first threshold; and when a periodic structure in said pictures of said video signal is detected, replacing the current motion vector corresponding to said first matching position by a motion vector of an adjacent pixel block, in particular, either from the block to the left or from the block above, whichever yields the smaller error in the current block, or by taking a combination of the motion vectors of said block to the left and said block above the current block.

2. A method according to claim 1, wherein said periodic structure in said pictures of said video signal is determined only when the maximum error in a row or column, exceeds a second preselected threshold.

3. A method according to claim 1, wherein said second preselected threshold is scaled in relation to a given dynamic range of a given error involved in the search, in particular to a maximum error belonging to the current block or to a block shifted according to a current minimum error position.

4. A method according to claim 2, wherein said second preselected threshold is scaled in relation to a given dynamic range of a given error involved in the search, in particular to a maximum error belonging to the current block or to a block shifted according to a current minimum error position.

5. Method according to claim 1 wherein:

minimum error $E1=E(X,Y)$;

maximum error $E2=\max_{x,y}\{E(x,y)\}$;

row minimum error $E3=\min_x(x\ |\pi|\neq X-1, X, X+1)\ \{E(x,Y)\}$;

row maximum error $E4=\max_x\{E(x,Y)\}$, and the block is periodic if, and only if, $$E3-E1<E2/4$$

and $E4-E1 \geq E2/2$, whereby the motion vector range is $(-M,+M)$ horizontally, therein $2M+1$ being the number of pixels which define the motion vector range in the horizontal direction and $(-N,+N)$ vertically, therein $2N+1$ being the number of pixels which define the motion vector range in the vertical direction, with the chosen motion vector related to said basic minimum matching error having the coordinates $(X,Y)$ wherein X is an element of the range $(-M,+M)$ and Y is an element of the range $(-N,+N)$ and the errors for each motion vector being $E(x,y)$, $x=-M, \ldots, +M$, $y=-N, \ldots, +N$.

6. Apparatus for correcting motion vectors which are related to pixel blocks into which the pictures of a video signal are divided, and comprising:

a) evaluating means for error values which are related to a matching of said pixel blocks between different pictures of said video signal, including:

first minimum value means for calculating from said error values a basic minimum error related to the current motion vector and to a first matching position associated with a pixel position;

second minimum value means for calculating a next minimum error corresponding to a second matching position which is not adjacent to said first matching position, and wherein the second matching position is associated with a pixel position in that pixel row or pixel column, respectively, to which the pixel position corresponding to said first matching position is associated, first maximum value means for calculating a maximum error from said error values, from which two threshold values are derived using errors involved in the calculation of said basic minimum error, which in particular belong to the current block or to a block shifted according to a current minimum error position;

second maximum value means for calculating from said error values a maximum error in the row, or column, containing said pixel position corresponding to said basic minimum error;

b) first comparing means for comparing the difference values between the outputs of said second and said first minimum value means with a first threshold, resulting in a first periodic structure decision if said next minimum error is less then said first threshold;

c) second comparing means for comparing the difference between the outputs of said second maximum and said first minimum value means with a second threshold resulting in a second periodic structure decision if said next minimum error is greater than/equal to said second threshold;

d) combining means for forming a final periodic structure decision from said first and said second periodic structure decisions;

e) vector replacement means which replaces the current motion vector of a current block corresponding to said basic minimum error by a given motion vector when said final periodic structure decision indicates that a periodic structure in the picture is detected, said given motion vector comprising a selected one of: (i) a motion vector of a block adjacent to the left side of the current block, (ii) a motion vector of a block adjacent to the top side of a current block, and (iii) a mean of said block adjacent to the left side of the current block and a block adjacent to the top side of the current block.

7. Apparatus according to claim 6, wherein said vector replacement means select using comparing means the motion vector either from the block to the left of said current block or from the block above said current block, whichever yields the smaller error in the current block.

8. Apparatus for providing motion vectors associated with blocks of image pixels, which said motion vectors interrelate a block of pixels in a current field/frame and a block of pixels in a previous field/frame which have similar image characteristics, said apparatus comprising:

a source of error values each of which corresponds to a function of differences between pixel values of said block of pixels in said current field/frame and one of a plurality of similar blocks within a search area of said previous field/frame;

a minimum detector for determining the minimum error value, E1 and establishing a motion vector for said block in the current field/frame in accordance with the coordinates of said block in the current field/frame with respect to a similar block within the search area of the previous field/frame associated with the minimum error value, E1;

storage means for storing sufficient vectors that at least vectors associated with a block immediately to the left of a current block are available;

circuitry for comparing respective error values associated with blocks in a row of blocks in said search area containing said similar block associated with the minimum error value, E1, for determining the next most minimum error value, E3, said next most minimum error value, E3, being outside said similar block containing said minimum error value, E1.;

circuitry for determining the maximum error value, E2, associated with blocks in said search area;

circuitry for comparing respective error values associated with blocks in a row of blocks in said search area containing said similar block associated with the minimum error value, E1, for determining the maximum error value, E4;

logic means for generating a control signal having a first state if:

$$E3-E1 < E2/4$$

and $$E4-E1 \geq E2/2$$

and a second state otherwise; and a multiplexer conditioned to pass as a motion vector associated with said block in said current field/frame, a motion vector established in accordance with the coordinates of said block within the search area of the previous field/frame associated with the minimum error value, E1, if said control signal is in said second state, and to pass a motion vector derived from said storage means if said control signal is in said first state.

* * * * *